Sept. 13, 1955 N. Q. LAWRENCE 2,717,919
IMAGE ICONOSCOPE FILM PICKUP APPARATUS
Filed Sept. 12, 1952
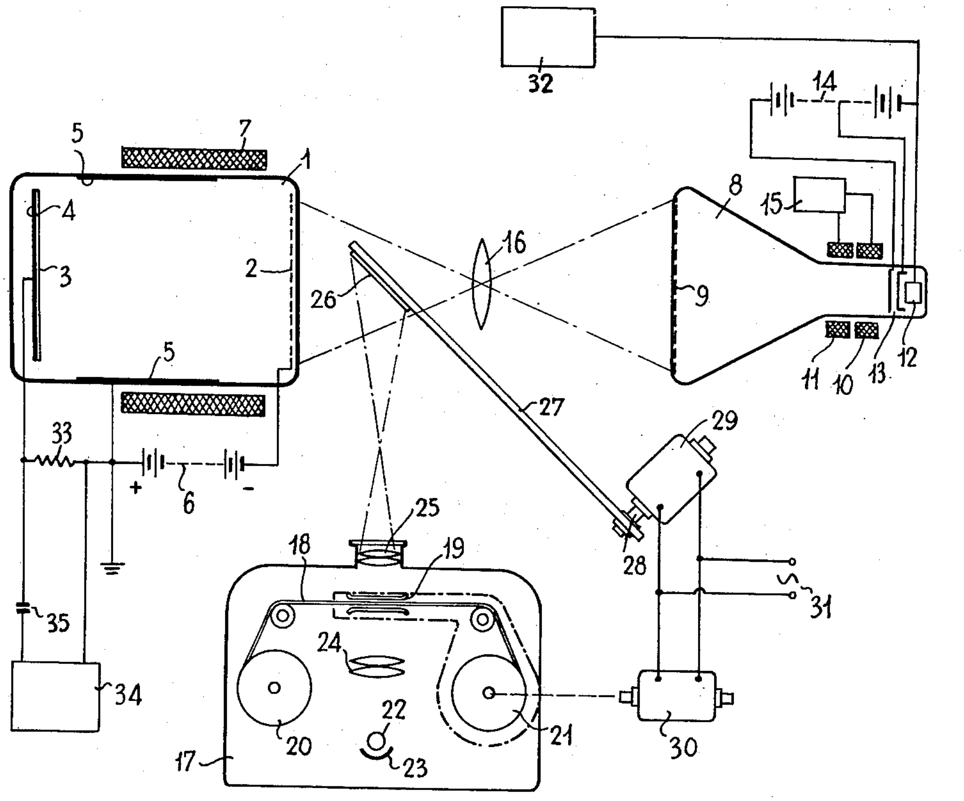
Inventor
NATHANIEL Q. LAWRENCE
By Emery Holcombe & Blair
Attorney 2,717,919

IMAGE ICONOSCOPE FILM PICKUP APPARATUS

Nathaniel Quentin Lawrence, Cambridge, England, assignor to Pye Limited, Cambridge, England, a British company Application September 12, 1952, Serial No. 309,186

Claims priority, application Great Britain September 26, 1951

7 Claims. (Cl. 178—7.2)

The specification of United States Patent No. 2,619,531 issued November 25, 1952, for "Pick-up tubes for television and the like" in the name of Donald Weighton describes television transmitting apparatus comprising a pick-up tube of the image iconoscope type in which the scanning of the target is effected by a moving beam of photoelectrons produced by scanning the same area of the photo-cathode as that on which the image of the subject to be televised is focussed by means of a moving light beam which is projected to the photo-cathode from a light source disposed outside the envelope of the pick-up tube.

According to the present invention the arrangement described in said copending application is modified for use in the transmission of cinematograph films by providing means for alternately imaging the picture and the scanning light spot on to the photo-cathode of the tube, the picture being projected on to the photo-cathode only during the frame retrace period of the scanning light spot and being subsequently scanned-off by the scanning light spot, during which time the film may be moved in the projector to the next frame.

According to one embodiment, the light from the film projector is reflected on to the photo-cathode by means of a mirror which is disposed at an appropriate angle, preferably 45°, in front of the photo-cathode, the mirror being intermittently moved into and out of its position in front of the photo-cathode in step with the scanning cycle of the system. The movement of the film projector and the mirror are so co-related that the mirror will be in front of the photo-cathode and the picture projected thereonto during the frame retrace time of the scanning light spot, the mirror moving out of its position in front of the photo-cathode during the time when the photo-cathode is being scanned by the light spot. The mirror may be opaque so that, whilst it is positioned in front of the photo-cathode, the scanning light spot from the light source, for example a cathode ray tube, cannot impinge on the photo-cathode.

In order that the invention may be more clearly understood, reference will now be made to the accompanying drawing, which shows one specific embodiment thereof by way of example.

In the drawing there is shown a pick-up tube of the image iconoscope type having an evacuated envelope 1, a photo-cathode 2 at one end of the envelope, and a target mosaic or electrode 3 backed by a signal plate 4 at the other end thereof. Around the inside wall of the envelope 1 of the tube there is provided a conductive coating 5 which is held at a very much higher potential than that of the photo-cathode 2, as schematically illustrated by the potential source 6 so that the coating 5 acts as an accelerating and collecting electrode. The coating 5 and a surrounding focussing coil 7 are employed to transfer an electron image emitted from the photo-cathode 2 to the target 3.

Mounted to face the pick-up tube 1 there is a cathode-ray tube 8 having a screen 9, conventional focussing and scanning coils 10 and 11 and an electron gun comprising a cathode 12 and an anode system 13 held at a higher potential than the cathode 12, as indicated by potential source 14. Conventional time-base and deflection-voltage sources are schematically illustrated at 15. The operation of such a tube is well-known in the art and need not be described in detail here. The travelling light spot on the screen 9 is focussed on to the photo-cathode 2 of the pick-up tube by means of a lens 16.

A cinematographic film projector is schematically illustrated at 17 in which a film 18 is arranged to be passed through a conventional gate 19 from a feed spool 20 to a take-up spool 21. Light from a light source 22 is reflected by means of a reflector 23 to pass through an optical condenser 24 and through the film 18 in the gate 19 and the illuminated image on the film is focussed by means of a projection lens 25 on to a mirror 26 mounted upon an arm 27 carried by a shaft 28 adapted to be rotated by means of a synchronous motor 29. A second synchronous motor 30 is employed to move both the film take-up spool 21 and also any suitable film-traction means to move the film intermittently through the gate 19, the inter-relation of the two elements being indicated by encasing them in chain-dotted lines. Such arrangements are wellknown in the art and, since they form no part of the present invention, are not specifically illustrated.

The mirror arm 27 is rotated by means of the motor 29 at the frame frequency of the cathode-ray tube 8, for example, 50 cycles per second, i. e. 3,000 R. P. M. and the film 18 is moved through the gate 19 of the projector at 25 frames per second, the two motors 29 and 30 being synchronised together and fed from the same source 31 so that the film is stationary in the gate while the mirror is in front of the photo-cathode 2. The phasing of the shaft rotation with respect to the scanning cycle of the apparatus is so arranged that the mirror 26 passes in front of the photo-cathode tube 2 during the frame retrace period of the cathode-ray tube 8. The mirror 26 may be opaque and to ensure that the scanning light spot is blanked out whilst the picture from the projector 17 is projected on to the photo-cathode 2 of the pick-up tube by means of the mirror 26, a blanking pulse generator 32 is connected to the cathode 12 of the tube 8 and operated to blank-off the beam current in correct phase. The electrons emitted from the photo-cathode 2 owing to the light incident from the film image are accelerated by the high potential-difference applied between the photo-cathode 2 and the accelerating electrode 5 so that the photo-electrons impinge on the target 3 with such velocity as to produce a secondary emission ratio which is greater than one. The electrons from the photo-cathode 2 are focussed by the magnetic lens formed by the coil 7 to form an image on the target 3 which is made of insulated material, preferably mica, so that a charge image is built-up on the surface of the target 3 corresponding to the scene which is to be televised. After the charge image due to the film light image is built-up on the surface of the target 3, the mirror is moved out of the way and a scanning beam of electrons is generated at the photo-cathode 2 due to the light arriving from the cathode-ray tube 8 and this beam of electrons is also accelerated and focussed on to the surface of the target 3 by the same accelerating electrode 5 and the same focussing coil 7. The beam of scanning electrons thus impinges upon the target with the same velocity as the image photo-electrons. The charges of each small element of surface of the target are discharged in turn by the scanning beam and the discharge current which constitutes the picture signal flows through a resistor 33 connected to the signal plate 4 capacitively associated with the target 3. Potentials corresponding to the picture signals are developed across the resistor 33 and are fed to an amplifier 34 through a condenser 35.

Thus, the mirror 26 is intermittently moved into and out of its position in front of the photo-cathode in step with the scanning cycle of the system and the movements of the film through the film projector and the mirror 26 are so corelated that the latter will be in front of the photo-cathode 2 and the picture projected thereon during the frame re-trace time of the scanning light spot.

What I claim is:

1. Apparatus for the television transmission of a cinematographic film, comprising a pick-up tube of the image iconoscope type having a photo-cathode and a target electrode, means for placing an image of a film frame on said photo-cathode to build up a charge image of said frame on said target electrode, a light source disposed outside the envelope of said pick-up tube, means for producing from said light source a light spot moving in a scanning raster, means for projecting an image of said raster on to the same area of said photo-cathode as that on which the image of said film frame is placed, means for alternately imaging said film frame image and said raster on said photo-cathode, said film frame image being placed on said photo-cathode only during the frame re-trace period of said scanning raster, and means for moving said film to a next frame during the time that said first-mentioned film frame image is being scanned.

2. Apparatus for the television transmission of a cinematographic film comprising a pick-up tube of the image iconoscope type having a photo-cathode and a target electrode, a cinematograph projector for projecting an image of a film frame on to said photo-cathode to build up a charge image on said frame on said target electrode, a cathode-ray tube disposed outside the envelope of said pick-up tube, means for building up a scanning raster on the screen of said cathode-ray tube, means for imaging said raster on to the same area of said photo-cathode as that on which the image of said film frame is placed, means for alternately imaging said film frame image and said scanning raster on said photo-cathode, said frame image being placed on said photo-cathode only during the frame re-trace period of said scanning raster, and means associated with said projector for moving the film to a next frame during the time that said first-mentioned film frame image is being scanned.

3. Apparatus for the television transmission of a cinematographic film comprising a pick-up tube of the image iconoscope type having a photo-cathode and a target electrode, a cinematograph projector for projecting an image of a film frame, a mirror located in the path of the light rays from said projector and disposed at an appropriate angle in front of said photo-cathode to project an image of the said film frame on to said photo-cathode, a light source disposed outside the envelope of said pick-up tube, means for producing from said light source a light spot moving in a scanning raster, means for imaging said raster on to the same area of said photo-cathode as that on which the image of said film frame is placed, means for moving said mirror intermittently into and out of position in front of the photo-cathode in step with the scanning cycle of said light spot to project an image of said film frame on to said mirror only during the frame re-trace period of said scanning raster, and means for moving said film to a next frame during the time that said first-mentioned film-frame image is being scanned.

4. Apparatus for the television transmission of a cinematographic film comprising a pick-up tube of the image iconoscope type having a photo-cathode and a target electrode, a cinematographic projector for projecting an image of a film frame, a mirror located in the path of the light rays from said projector and disposed at an appropriate angle in front of said photo-cathode to project an image of the said film frame on to said photo-cathode, a cathode-ray tube disposed outside the envelope of said pick-up tube, means for building up a scanning raster on the screen of said cathode-ray tube, means for imaging said raster on to the same area of said photo-cathode as that on which the image of said film frame is placed, means for moving said mirror intermittently into and out of position in front of the photo-cathode in step with the scanning cycle of said scanning raster, means for projecting an image of said film frame on to said photo-cathode only during the frame re-trace period of said scanning raster, and means for moving said film to a next frame during the time that said first-mentioned film frame image is being scanned.

5. Apparatus as claimed in claim 4, comprising further means for correlating the movement of the film through said film projector and the movement of said mirror to position said mirror in front of said photo-cathode for projecting an image of said frame on to said photo-cathode during the frame re-trace time of the said scanning raster, and means for moving said mirror out of its position in front of said photo-cathode during the time when said photo-cathode is being scanned.

6. Apparatus for the television transmission of a cinematographic film comprising a pick-up tube of the image iconoscope type having a photo-cathode and a target electrode, a cinematographic projector for projecting an image of a film frame, a mirror located in the path of the light rays from said projector and disposed at an appropriate angle in front of said photo-cathode to project an image of the said film frame, a light source disposed outside the envelope of said pick-up tube, means for producing from said light source a light spot moving in a scanning raster, means for imaging said raster on to the same area of said photo-cathode as that on which the image of said film frame is placed, an arm carrying said mirror and mounted on a shaft, means for rotating said shaft to move said mirror intermittently into and out of position in front of the photo-cathode in step with the scanning cycle of said light spot to project an image of said film frame on to said mirror only during the frame re-trace period of said scanning raster, and means for moving said film to a next frame during the time that said first-mentioned image is being scanned.

7. Appaartus for the television transmission of a cinematographic film comprising a pick-up tube of the image iconoscope type having a photo-cathode and a target electrode, a cinematographic projector for projecting an image of a film frame, a mirror located in the path of the light rays from said projector and disposed at an angle of 45° to the axis of said pick-up tube and in front of said photo-cathode to project an image of the said film frame, a cathode-ray tube disposed outside the envelope of said pick-up tube, means for building up a scanning raster on the screen of said cathode-ray tube, means for imaging said raster on to the same area of said photo-cathode as that on which the image of said film frame is placed, means for moving said mirror intermittently into and out of position in front of the photo-cathode in step with the scanning cycle of said scanning raster, means for projecting an image of said film frame on to said photo-cathode only during the frame re-trace period of said scanning raster, and means for moving said film to a next frame during the time that said first-mentioned film frame image is being scanned.

References Cited in the file of this patent

UNITED STATES PATENTS

| | | |
|---|---|---|
| 2,287,033 | Goldmark | June 23, 1942 |
| 2,288,096 | Lubcke et al. | June 30, 1942 |
| 2,306,272 | Levy | Dec. 22, 1942 |

FOREIGN PATENTS

| | | |
|---|---|---|
| 517,483 | Great Britain | Jan. 31, 1940 |
| 857,705 | France | Sept. 26, 1940 |